Jan. 26, 1960　　　　F. A. KROHM　　　　2,922,181
WINDSHIELD WIPER BLADE ASSEMBLY
Filed April 8, 1953
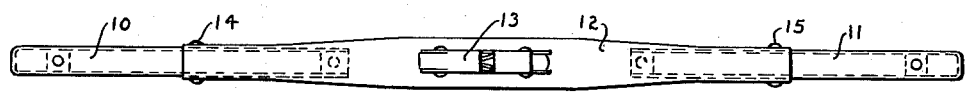
*Fig.-1*
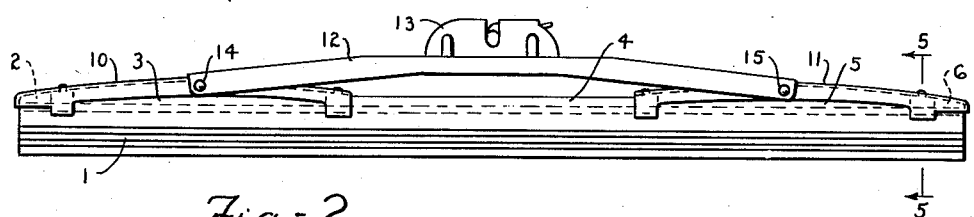
*Fig.-2*
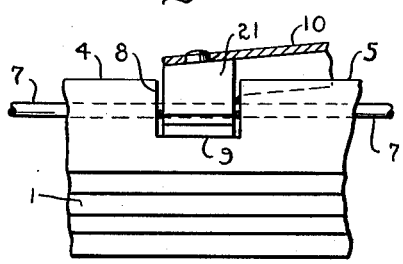　　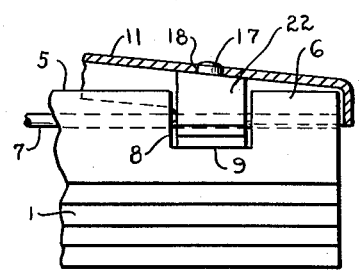
*Fig.-3*　　*Fig.-4*
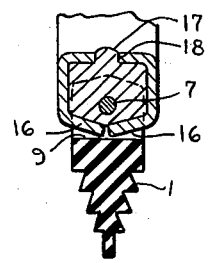
*Fig.-5*
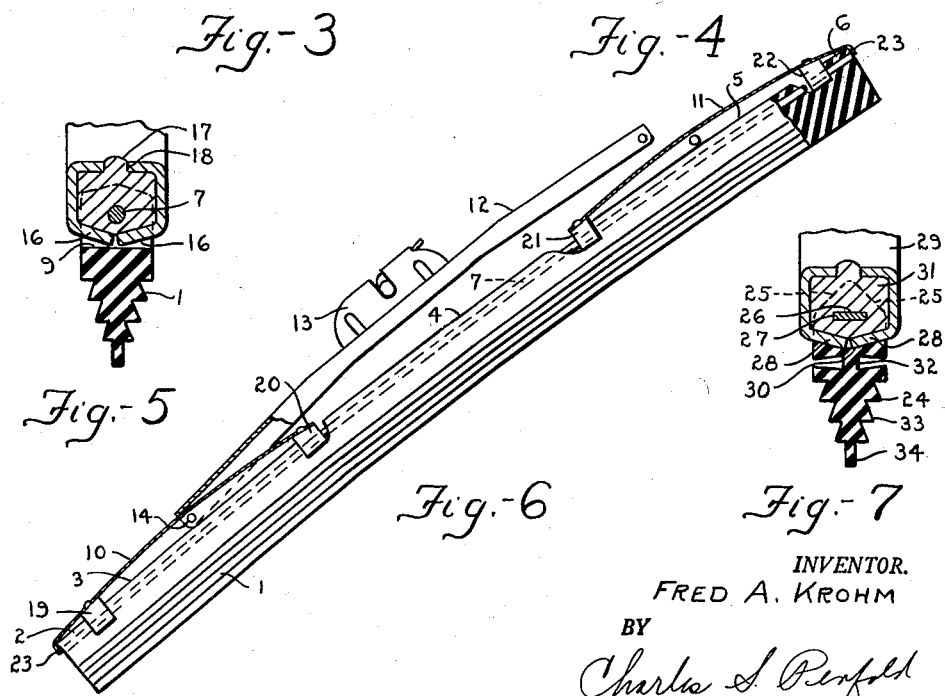
*Fig.-6*
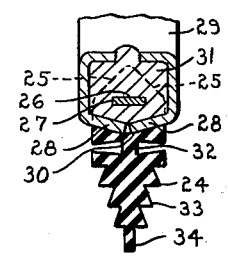
*Fig.-7*
INVENTOR.
FRED A. KROHM
BY
Charles S. Penfold
ATTORNEY

United States Patent Office 2,922,181
Patented Jan. 26, 1960

2,922,181
WINDSHIELD WIPER BLADE ASSEMBLY

Fred A. Krohn, Hobart, Ind., assignor to The Anderson Company, a corporation of Indiana Application April 8, 1953, Serial No. 347,571

11 Claims. (Cl. 15—245)

This invention relates generally to windshield wiper apparatus and more particularly is directed to a wiper blade assembly or unit.

At least one form of wiper blade assembly now in use for wiping flat and/or curved surfaces of windshields comprises a blade and a pressure-distributing device operatively connected to the blade. More specifically in this regard, the blade is preferably comprised of a resilient wiper element and a flexible support therefor, and the pressure-distributing device preferably includes a pair of secondary yokes having their ends pivotally connected to the blade and a primary yoke or bridge means having its extremities connected to intermediate portions of the secondary yokes. The primary yoke or bridge is provided with a connector detachably connectable with a fitting carried by a wiper arm.

In wiper blade assemblies of the above or similar character, the operative relationship of the secondary yokes with the blade and the primary yoke is such that in some instances, depending on weather conditions, snow will collect and pack between these parts to such an extent that the parts cannot move relative to one another. As a consequence, the blade assembly will not function properly, or conform to the curvature of the surface to be cleaned.

One objective of the present invention is to embody improved principles of design and construction in a blade assembly of the type above referred to whereby there is little or no opportunity for snow or other foreign matter to collect and interfere with the operation of the wiper blade assembly.

A further object of the invention is to provide a novel method of assembling the components, including an arrangement whereby one of the means pivotally connecting a secondary yoke to an end of the primary yoke serves as a key for locking all of the components together in their respective operative positions.

More particularly, an object of the invention is to provide the wiper element with attaching means preferably in the form of a tubular back portion or a plurality of attaching portions through which the support extends. The support may be constructed in various ways, but is preferably made in the form of a flexible cylindrical rod or stay to which the ends of the secondary yokes are connected at longitudinally spaced points for applying and distributing pressure to the blade.

Another object of the invention is to construct the outer ends of the secondary yokes so that they extend about the extremities of the wiper element to protect such extremities and improve the general appearance of the blade assembly.

An important object is to substantially conceal the support and also form the wiper element so as to deflect or prevent, snow, sleet or ice from collecting on the element.

A significant object of the invention is to provide the ends of the secondary yokes with receiving or bearing means through which the flexible support extends to interconnect these yokes and the support in a manner whereby the blade may rock relative to the pressure device and/or the wiper element with respect to the support or pressure device. These particular relative movements and those occurring between the three yokes while the blade is in operation not only contribute to cause the wiper element to readily conform and efficiently clean a surface to be wiped, but serve to prevent the deposit or collection of any snow on the assembly and also break up and release any sleet or ice that might otherwise collect on the assembly.

A specific object of the invention is to design and construct the said receiving means on the secondary yokes so that they provide ample bearing and stability for the flexible support, particularly at the extremities of the support in order that the free extremities of the wiper element extending outwardly from the outer ends of the secondary yokes are maintained in predetermined operative positions.

Another object of the invention is to form the ends of the secondary yokes and portions of the wiper element in a manner whereby to control, within practical limits, the lateral flop or tilting of the wiper blade with respect to the pressure device.

Other attributes of the invention reside in its simplicity of design and construction, economy of manufacture, durability, and efficiency of operation.

Many other objects and advantages of the invention will become apparent when the description herein set forth is considered in conjunction with the drawings annexed hereto.

In the drawings:

Figure 1 is a top view of the windshield wiper blade assembly embodying the invention;

Figure 2 is a side view of the blade assembly illustrated in Figure 1;

Figure 3 is an enlarged side view of a portion of the assembly shown in Figure 2, depicting the operative connection between the inner end of each secondary yoke and the support;

Figure 4 is an enlarged side view of a portion of the assembly, similar to Figure 3, showing the connection between the outer end of each secondary yoke and the support;

Figure 5 is a vertical section, taken substantially on line 5—5 of Figure 2 exemplifying additional details of construction;

Figure 6 is a side view of the blade assembly with the components arranged to illustrate one mode of their assembly; and Figure 7 is a transverse section taken through a modified form of blade.

Referring first to the structure exemplified in Figures 1 through 6 of the drawings, the wiper blade assembly, among other things, includes a wiper blade and a pressure-distributing device.

More particularly, the wiper blade comprises a resilient wiper member and an elongate uniformly flexible support detachably secured together. The wiper member may be designed and constructed as desired, but as herein shown, is provided with a wiping portion 1 and attaching means preferably in the form of a plurality of longitudinally extending tubular portions 2, 3, 4, 5 and 6.

The support for the wiper element may be designed and constructed as desired, but is preferably comprised of a single member in the form of a stay, flexible cylindrical rod or wire 7 which is threaded or passed through the tubular portions 2 through 6 to interconnect the wiper element and support and substantially conceal the support. The fit between the element and support is normally sufficient to prevent relative longitudinal movement therebetween. The tubular portions of the element are axially spaced apart by providing four interruptions or notches 8 in the back of the element. Each notch is defined by adjacent ends of the tubular portions and a base portion 9 as shown in Figures 3 and 4. As will be pointed out subsequently, the base portions constitute abutment means.

The pressure-distributing device may be constructed in various ways, but as herein illustrated, preferably includes a pair of corresponding secondary yokes 10 and 11, a primary yoke 12, and a connector 13 for detachably connecting the assembly to a spring-pressed wiper arm. The ends of the secondary yokes are connected to the blade at longitudinally spaced points or locations and the ends of the primary yoke are pivotally connected to intermediate portions of the secondary yokes by pivots 14 and 15. The connector 13 is carried by the primary yoke.

The secondary yokes are preferably of channel construction and slightly curved so as to provide sufficient clearance for free inward movement of those portions of the blade between the respective ends of the yokes. The ends of the secondary yokes may be connected to the blade in any desirable manner, but as herein shown each end is provided with receiving means or a tubular bearing secured in place by ears 16 formed on the yokes. It will be noted that the ears extend under the bearings in a predetermined angular relationship to the base portions 9 of the notches and that each bearing is provided with a projection 17 which registers with an aperture 18 in the base wall of each secondary yoke for locking the bearings against axial displacement. The ears 16 constitute abutment means which alternately engage the base portions or abutment means 9 to control the range of pivoted movement between the blade and pressure device. The bearings are identical in construction and as shown in Figure 6 the secondary yoke 10 is provided with bearings 19 and 20 and the yoke 11 with bearings 21 and 22. These bearings are disposed in the notches 8 and freely pivot about the longitudinal axis of the support. It will also be noted that the secondary yokes are provided with outer end continuations 23 which are constructed so as to shield or protect the end portions of the wiper element as well as promote the general appearance of the wiper blade assembly. The continuations also serve to conceal the ends of the support and positively lock the support in the tubular portions of the wiper element. Each bearing is provided with a hole through which the support is threaded. Attention is directed to the fact that the bearings are of an axial length sufficient to properly stabilize the support and particularly the free ends of the support so as to maintain the outer ends of the wiping element in predetermined operative positions.

It is to be understood that means other than the specific form of bearings 19 through 22 may be satisfactorily employed. For example, the base wall of each of the secondary yokes may be provided with an inturned tongue or projection having a hole therein through which the support may be threaded. Also, if found desirable the outer end continuation of each secondary yoke may be provided with a hole through which the support may be threaded.

The pressure device and wiper blade may be assembled and disassembled in various ways but, as exemplified in Figure 6, assembly is preferably accomplished by placing the bearings 19 and 20 of the secondary yoke 10 and the bearing 21 of the secondary yoke 11 in certain of the notches, after which the support is threaded successively through the tubular portions 6 and 5, bearing 21, tubular portion 4, bearing 20, portion 3, bearing 19 and portion 2, until the support engages the outer end continuations 23 of the secondary yoke 10. The secondary yoke 11 is then moved longitudinally outwardly so that the bearing 21 will stretch or force the tubular portion 5 outwardly beyond the end of the support last to enter the element to clear the end notch adjacent thereto. The bearing 22 on the secondary yoke 11 is then more or less squeezed into this notch for registry with the end of the support, whereupon the tubular portion 5 is released to permit it to automatically move inwardly to its normal position and cause the end of the support to extend through the bearing 22 and the end tubular portion 6 to secure the support in the element and the outer end of the secondary yoke 11 to the support. After the secondary yokes have thus been connected to the support the free end of the primary yoke is fitted over the secondary yoke 11 and pivotally connected thereto by the cross pin or pivot 15. The pivot 15 serves as a key to positively lock the components of the assembly in the predetermined operative positions illustrated. Obviously, the method of assembly just described can be similarly accomplished by first securing the secondary yoke 11 to the support so that the outer end of the yoke 10 is the last to be attached to the support, after which the yoke 10 would be connected to the primary yoke by the pivot 14.

As pointed out above, the inturned ears 16 of the secondary yokes are located in predetermined positions with respect to the base portions 9 of the notches 8. The purpose of this arrangement is to allow and control the range of flop or lateral movement of the blade with respect to the pressure device. More specifically in this regard the inturned ears are adapted to alternately engage the base portions 9 as the pressure device pivots on the support while the blade assembly is wiping a surface to be cleaned. As alluded to above, the wiper element may move to some extent relative to the support while the assembly is in operation.

The support in combination with the pressure device has proven in actual use as a sufficient stabilizer to influence and produce the desired wiping action to cause the wiper element to accommodate itself equally well to either a curved or flat surface.

In the modification of the invention illustrated in Figure 7, the wiper element 24 is provided with tubular portions having inclined or sloping surfaces 25 which serve to deflect snow away from the blade. Each of the tubular portions is formed with an opening 26 of rectangular cross dimension to receive a support 27 of corresponding cross section. The wiper element is also provided with notches and the base portion of each notch is cupped or formed to receive the ears 28 on a secondary yoke 29 as indicated at 30 to substantially prevent relative movement between the back portion of the element and a pressure device. The support 27 extends through bearings, one of which is indicated at 31. In order to facilitate proper movement of the wiper element, it is provided with a neck or intermediate restricted portion 32 to form a head 33 having a wiping lip 34 thereon. The neck serves to control the flop or lateral movement of the head 33.

In view of the foregoing it will be manifest that the blade assembly embodies improved principles of design and construction.

Having thus described my invention, it is obvious that various other modifications may be made in the same without departing from the spirit of my invention; hence I do not wish to be understood as limiting myself to the exact forms, constructions, arrangements and combinations of parts herein shown and described or uses mentioned.

I claim:

1. An elongate windshield wiper assembly comprising a wiper element having a tubular back portion and a wiping portion, an elongate support extending through the back portion, said back portion being interrupted to expose longitudinally spaced portions of the support, an elongate pressure device extending lengthwise of the wiper assembly and having longitudinally spaced portions connected to the exposed portions of the support at locations within the confines of the element to afford a rocking action between the blade assembly and pressure device, and additional portions adjacent the ends of the blade for locking the support in the back portion.

2. A windshield wiper assembly comprising a blade and an elongate pressure device, said blade comprising a wiper element having a tubular back portion and a wiping portion, an elongate flexible support extending through the back portion, said back portion being interrupted to expose portions of the support, said pressure device extending lengthwise of the blade and having at least three portions extending into the interruptions and pivotally connected to the exposed portions of the support, internal abutment means provided on the wiper element, and abutment means provided on the pressure device alternately engageable with the abutment means on the wiper element for controlling the range of pivotal movement between the blade and pressure device.

3. A windshield wiper assembly comprising a resilient wiper element having a tubular back portion and a wiping portion, said portions extending substantially throughout the entire length of the element, a resiliently flexible support extending through the back portion and supporting the element in a relaxed condition, and a pressure device having relatively movable parts, certain of said parts having ends extending into the back portion, said ends being provided with apertures through which the support extends for operatively connecting the wiper assembly and pressure device.

4. A windshield wiper assembly comprising a wiper blade and a pressure device, said blade comprising a wiper element having a back portion and a wiping portion, a support mounted on the back portion, said pressure device comprising a pair of secondary yokes having their ends connected to the blade at longitudinally spaced points, and a primary yoke having its ends connected to the secondary yokes, said primary yoke having means for attaching the blade assembly to a wiper arm, said secondary yokes being provided with integral continuations extending into the back portion and connected to the support.

5. A windshield wiper assembly comprising a wiper blade and an elongate pressure device extending lengthwise of the blade, said blade comprising a wiping element and a support supporting the element in a relaxed condition, said pressure device comprising a plurality of relatively movable parts having ends extending into the wiping element and pivotally connected to the support at longitudinally spaced points, and connector means on the device for attaching the blade assembly to a wiper arm, said ends and said wiping element being so structurally related and spaced that said ends will alternately engage internal portions of the wiping element to assist in controlling the range of pivotal movement between the blade and pressure device.

6. A windshield wiper assembly comprising a wiper blade and a pressure device, said blade comprising a wiper element having a tubular back portion and a wiping portion, a support extending through the back portion, said back portion being interrupted at longitudinally spaced points to expose portions of the support within the confines of the element, said pressure device having receiving means extending into the element and connected to the support by threading the support through the receiving means, one of said receiving means being connectible to one of the exposed portions of the support by stretching a portion of the back portion to obtain access to an end of the support to permit threading of such end into said receiving means.

7. A windshield wiper assembly comprising a blade and a pressure device, said blade comprising an elongate wiping element and an elongate support extending through the element and supporting it in a relaxed condition, said pressure device comprising an elongate member having receiving means at its ends disposed in the wiping element and receiving said support at locations spaced inwardly from the ends of the element, said support being slidable on the wiping element while the receiving means are disposed in the element for detachably holding the pressure device and blade together.

8. A windshield wiper assembly comprising a resilient tubular blade and a pressure device having longitudinally spaced receiving means disposed in the blade, and a flexible support extending through the blade and receiving means operatively connecting the blade and pressure device and being slidable while the receiving means are disposed in the blade for disconnecting the blade and pressure device.

9. A windshield wiper assembly comprising a resilient wiping element and a pressure device having longitudinally spaced receiving means disposed in the element, and a flexible support extending through and located within the confines of the element and through the receiving means for supporting the element in a relaxed condition and connecting the pressure device thereto.

10. A windshield wiper assembly comprising a resilient wiping element having a tubular attaching portion and a wiping portion hinged to the attaching portion for movement with respect thereto, said assembly also including a pressure device having longitudinally spaced receiving means disposed in the attaching portion, and a flexible support extending through the receiving means and attaching portion and arranged within the confines of the latter for connecting the pressure device thereto and so that the element may freely flex to readily conform to the surface to be wiped, said support being slidable in the receiving means while the latter are disposed in the attaching portion for releasing the pressure device from the support.

11. A windshield wiper assembly comprising a blade having an elongate resilient wiping member provided with a tubular attaching portion and a wiping portion hinged to the attaching portion for oscillatory movement with respect thereto, an elongate continuous resilient flexible supporting member slidably mounted in said attaching portion, a pressure device operatively connected to the blade at longitudinally spaced locations between the ends of the wiping member in a manner whereby to permit the support to freely flex, and means adjacent the ends of the blade serving as abutments for the members for holding them assembled with the pressure device.

References Cited in the file of this patent

UNITED STATES PATENTS

| | | |
|---|---|---|
| 2,179,451 | Horton | Nov. 7, 1939 |
| 2,230,489 | Grossfield | Feb. 4, 1941 |
| 2,265,551 | Steccone | Dec. 9, 1941 |
| 2,543,383 | Scinta | Feb. 27, 1951 |
| 2,596,063 | Anderson | May 6, 1952 |
| 2,632,907 | Anderson | Mar. 31, 1953 |
| 2,634,446 | Mackie | Apr. 14, 1953 |
| 2,659,097 | Morton | Nov. 17, 1953 |
| 2,712,146 | Wise | July 5, 1955 |
| 2,792,585 | Scinta | May 21, 1955 |

FOREIGN PATENTS

| | | |
|---|---|---|
| 109,121 | Australia | Nov. 15, 1939 |